(12) United States Patent
Yang et al.

(10) Patent No.: US 8,514,394 B2
(45) Date of Patent: Aug. 20, 2013

(54) SPECTROGRAPH HAVING MULTIPLE WAVELENGTH RANGES FOR HIGH RESOLUTION RAMAN SPECTROSCOPY

(75) Inventors: Wei Yang, Fremont, CA (US); Ming Chai, Union City, CA (US); Charlie Zhang, Fremont, CA (US); Patrick Yang, Fremont, CA (US)

(73) Assignee: BaySpec, Inc., Fremont, CA (US)

( * ) Notice: Subject to any disclaimer, the term of this patent is extended or adjusted under 35 U.S.C. 154(b) by 354 days.

(21) Appl. No.: 12/853,222

(22) Filed: Aug. 9, 2010

(65) Prior Publication Data

US 2012/0033213 A1 Feb. 9, 2012

(51) Int. Cl.
*G01J 3/28* (2006.01)

(52) U.S. Cl.
USPC .......................................................... 356/328

(58) Field of Classification Search
USPC .......................................... 356/326, 328, 334
See application file for complete search history.

(56) References Cited

U.S. PATENT DOCUMENTS

| | | | |
|---|---|---|---|
| 5,112,127 A | 5/1992 | Carrabba et al. | |
| 5,905,571 A | 5/1999 | Butler et al. | |
| 6,108,290 A | 8/2000 | Narumi et al. | |
| 6,167,290 A | 12/2000 | Yang et al. | |
| 6,275,630 B1 | 8/2001 | Yang et al. | |
| 6,563,977 B1 | 5/2003 | Chen et al. | |
| 6,704,509 B1 | 3/2004 | Yang et al. | |
| 6,888,980 B2 | 5/2005 | Yu et al. | |
| 7,085,492 B2 * | 8/2006 | Ibsen et al. ...................... 398/38 |

OTHER PUBLICATIONS

Barman, I. et al., (Jul. 15, 2010, e-pub. Jun. 24, 2010). "Accurate Spectroscopic Calibration for Noninvasive Glucose Monitoring by Modeling the Physiological Glucose Dynamics," *Analytical Chemistry* 82(14):6104-6114.

Bowie, B.T. et al. (May 2000), "Factors Affecting the Performance of Bench-Top Raman Spectrometers: Part 1: Instrumental Effects," *Applied Spectroscopy* 54(5):151A, 164A-173A.

Bowie, B.T. et al. (2000), "Factors Affecting the Performance of Bench-Top Raman Spectrometers: Part 2: Effect of Sample," *Applied Spectroscopy* 54(6): 200A-207A.

Chase, B. (1994), "A New Generation of Raman Instrumentation," *Applied Spectroscopy* 48(7):14A-19A.

(Continued)

*Primary Examiner* — Tarifur Chowdhury
*Assistant Examiner* — Abdullahi Nur
(74) *Attorney, Agent, or Firm* — Morrison & Foerster LLP

(57) ABSTRACT

A spectrograph having multiple excitation wavelength ranges is disclosed. The spectrograph can include a wavelength switching mechanism to switch between different wavelength ranges in accordance with the wavelength of an incoming light signal. The wavelength switching mechanism can include multiple optical assemblies (or elements) corresponding to the different wavelength ranges for processing the incoming light signal. The mechanism can also include a switching component for switching the optical assemblies to align the appropriate assembly with the incoming light signal. Each optical assembly can include one or more transmission gratings to disperse the incoming light signal into multiple wavelengths within a particular wavelength range and a reflecting mirror proximate to the grating(s) to reflect the wavelengths of light back through the grating(s) to photodetectors for measuring to wavelengths to generate a light spectrum. The spectrograph can be used in Raman spectroscopy.

18 Claims, 16 Drawing Sheets

(56) References Cited

OTHER PUBLICATIONS

Bangalore, A.S. et al. (1999), "Effect of Spectral Resolution on Pattern Recognition Analysis Using Passive Fourier Transform Infrared Sensor Data," *Applied Spectroscopy* 53(11):1382-1391.

Christesen, S. et al. (1999), "Nonintrusive Analysis of Chemical Agent Identification Sets Using a Portable Fiber-Optic Raman Spectrometer," *Applied Spectroscopy* 53(7):850-855.

Draga, R.O.P. et. al. (Jul. 15, 2010, e-pub. Jun. 4, 2010). "In Vivo Bladder Cancer Diagnosis by High-Volume Raman Spectroscopy," *Analytical Chemistry*, 82(14):5993-5999.

Frost, K.J. et al. (1998). Calibration of Raman Spectrometer Instrument Response Function With Luminescence Standards: An Update,*Applied Spectroscopy* 52(12):1614-1618.

Harvey, S.D. et al. (2002). "Blind Field Test Evaluation of Raman Spectroscopy as a Forensic Tool," *Forensic Science International* 125:12-21.

Imasaka, T. et al. (Mar. 15, 1990), "Diode Lasers and Practical Trace Analysis," *Analytical Chemistry* 62(6):363A-364A, 369A-371A.

Jaakkola, P. et al. (1997). "Instrumental Resolution Considerations for Fourier Transform Infrared Gas-Phase Spectroscopy," *Applied Spectroscopy* 51(8):1159-1169.

Jordan, J.R. (Dec. 1998). "Raman Spectrometers: A Field Guide to Instrumentation," *Inside Laboratory Management* 2(12):24-25.

Kawai, N.T. et al. (Oct. 2000). "Chemical Identification With a Portable Raman Analyzer and Forensic Spectral Database," *Spectroscopy* 15(10):32, 34, 36-41.

Laserna, J.J. ed. (1996). *Modern Techniques in Raman Spectroscopy*, Wiley & Sons Ltd., West Sussex, England, pp. 47-61.

Lewis, I.R. et al. (1995). "Raman Spectroscopic Studies of Explosive Materials Towards a Fieldable Explosives Detector," *Spectrochimica Acta: Part A* 51:1985-2000.

Mann, C.K. et al. (2000). "Chemical Analysis With a Low-Resolution Raman Spectrometer," *Applied Spectroscopy* 54(5):742-746.

McCreery, R.L. (Feb. 1996). "Analytical Raman Spectroscopy: An Emerging Technology for Practical Applications," *American Laboratory* 28:34X, 34BB-34DD, 34FF, 34HH, 34JJ.

McCreery, R.L. (2000). "Sampling Modes in Raman Spectroscopy," Chapter 6 in *Raman Spectroscopy for Chemical Analysis*vol. 157 *in Chemical Analysis: A Series of Monographs on Analytical Chemistry and Its Applications*, Winefordner, J.D. ed., Wiley & Sons Inc., New York, New York, 157:95-103.

Mulvaney, S.P. et al. (Jun. 15, 2000). "Raman Spectroscopy," *Analytical Chemistry* 72(12):145R-157R.

Pelletier, M. et al. (Feb. 1996). "Raman Spectroscopy: The next generation," *American Laboratory* pp. 34C-34F, 34J, 34L, 34N.

Qin, D. et al. (May 15, 1997). "Quantitative Analysis of Process Streams by Online FT-IR Spectrometry," *Analytical Chemistry* 69(10):1C,1942-1945.

Sameer, L. et al. (Oct. 2005). "On-Line Raman Analysis of Ethylene and Hexene in the Phillips 1-Hexene and Polyethylene Processes," *Gulf Coast Conference*, Galveston Island, Texas, Oct. 18-20, 2005, Abstract No. 32, p. 26.

Smith, J.P. (Oct. 1, 2000), "Spectrometers get Small: Miniature Spectrometers Rival Benchtop Instruments," *Analytical Chemistry* 72:653A-658A.

Sweedler, J.V. et al. (Feb. 15, 1988). "High-Performance Charge Transfer Device Detectors," *Analytical Chemistry* 60(4):282A-284A, 286A, 288A, 290-291A.

* cited by examiner

SPECTROGRAPH HAVING MULTIPLE WAVELENGTH RANGES FOR HIGH RESOLUTION RAMAN SPECTROSCOPY

FIELD

This relates generally to spectrographs and, more particularly, to spectrographs covering multiple wavelength ranges at high spectral resolution and high optical throughput.

BACKGROUND

Biomedical and analytical instrumentation professionals have recognized the benefits of using different wavelength excitations in Raman spectroscopy for many applications, such as lab analysis, patient monitoring, and field work. Since a Raman spectroscopic analyzer (or spectrograph) has a single wavelength excitation and spectral range, multiple analyzers covering different wavelength excitations have been used. For example, a Raman analyzer optimized for a wavelength excitation range from about 532 nm to about 640 nm has been used with a Raman 532 nm excitation laser and a Raman analyzer optimized for a wavelength excitation range from about 785 nm to about 1100 nm has been used with a Raman 785 nm excitation laser. It has been virtually impossible for the different excitation lasers to use the same analyzer. However, providing multiple analyzers has been problematic for a number of reasons. The analyzers are large and expensive, resulting in higher cost and space requirements for housing more than one analyzer. Moreover, the analyzers are fragile and complex, requiring highly trained persons to operate them.

Commonly used excitation wavelengths have been about 532 nm and about 785 nm. Recently, however, it has been determined that longer excitation wavelengths in the near infrared, e.g., about 1064 nm, can be advantageous in Raman analysis of highly fluorescent samples, especially biological samples, such as tissue or skin samples, measured both in-vivo and in-vitro. For example, it has been determined that longer excitation wavelengths can reduce or eliminate fluorescence interference with the Raman signal to be analyzed. This, of course, adds another wavelength excitation range for which a Raman analyzer would be needed. For example, a Raman 1064 nm excitation laser would need a Raman analyzer optimized for a wavelength excitation range from about 1064 nm to about 1700 nm.

Due in part to the above-mentioned problems associated with using multiple analyzers, some professionals have opted to use a single Raman analyzer that most effectively works for their particular application. However, selecting the analyzer has not been without concern. For example, along with the analyzer, the corresponding excitation laser must also be selected. It is well known among analytical chemists and vibrational spectroscopy professionals that, albeit Raman spectroscopy is a true "color-blinded" technology in term of excitation laser wavelengths vs. Raman shifts, special attention must be given when choosing an excitation laser. The laser wavelength (and power) must be selected in reference to the target sample(s) to be analyzed. Moreover, tradeoffs must be made regarding laser availability, Raman detection sensitivity, sample damage, and sample fluorescence interference.

Additional, the analysis technology used by the analyzer has not been without concern. Primarily Fourier transform (FT) technology has been used in the analyzers. However, such technology involves moving parts, e.g., a moving reflection mirror, large size elements, cumbersome operation, e.g., cryogenic cooling of photodetectors, and vibration or shock. One example of this technology is a Michaelson interferometer. As a result, this technology can cause instability in the Raman analysis.

To address some of the concerns associated with FT technology, a dispersive Raman analyzer based on a transmissive volume phase grating (VPG) has been developed, which can operate without moving parts. The analyzer is used in conjunction with an photodetector, such as a CCD array or an InGaAs array, operated at room temperature or cooler temperatures via thermal electrical (TE) cooling. Accordingly, the dispersive analyzer reduced or eliminated vibration or shock, moving parts, and some cumbersome operation, e.g., regarding cooling of photodetectors.

To address size and expense of Raman analyzers, optical telecommunications technology began to enter the spectroscopy area, particularly with regard to the excitation wavelength range of about 1000 nm to about 1700 nm. Such optical technology includes light source, detection devices, and so on, resulting in more reliable and less expensive spectroscopy instruments. Miniature lasers, compact narrow and broadband light sources, holographic and other optical elements, sensitive solid state optoelectronics, and fast computer chips are only a few examples of the contributions made by optical technology to spectroscopy.

While spectroscopy advances have addressed many concerns as described above, there remains the difficulty in providing different wavelength excitations for Raman spectroscopy applications in a productive, cost effective, efficient manner.

SUMMARY

This relates to a spectrograph having multiple excitation wavelength ranges in Raman spectroscopy. As a result, the spectrograph can cover a broad wavelength range from about 200 nm to about 1700 nm, for example, at a high resolution and high optical throughput. The spectrograph can include a wavelength switching mechanism to switch between multiple optical assemblies (or elements) for dispersing different wavelength ranges of incoming light signals. The light signals can provide Raman signals from samples irradiated with an excitation laser. The wavelength switching mechanism can mount the optical assemblies and switch the assemblies to align the incoming light signal with the appropriate assembly according to the signal's wavelength. The mechanism can switch the optical assemblies either manually or electrically.

In some embodiments, an optical assembly can include a transmission grating for dispersing an incoming light signal into multiple wavelengths within a particular wavelength range and a reflecting mirror for reflecting the dispersed wavelengths back through the grating to one or more photodetectors for measurement and analysis.

In some embodiments, an optical assembly can include more than one transmission grating for dispersing an incoming light signal into multiple wavelengths within a particular wavelength range and a reflecting mirror for reflecting the dispersed wavelengths back through the gratings to one or more photodetectors for measurement and analysis.

In some embodiments, an optical assembly can include a holographic transmission element disposed between two substrates for dispersing an incoming light signal into multiple wavelengths within a particular wavelength range and a reflecting surface on one of the substrates for reflecting the dispersed wavelengths back through the element to one or more photodetectors for measurement and analysis.

In some embodiments, a spectrograph can include an aperture for providing the incoming light signals, a collimating, focusing lens for collimating and focusing light signals, a wavelength switching mechanism as described above for dispersing the light signals, and one or more photodetectors for measurement and analysis.

In some embodiments, a single photodetector can be used for measurement and analysis over substantially the entire wavelength range of the spectrograph. An example of such a photodetector includes a CCD array.

In some embodiments, multiple photodetectors can be used in a stacked configuration for measurement and analysis, where one of the photodetectors can cover a portion of the wavelength range, e.g., about 200 nm to about 1100 nm, and another of the photodetectors can cover another portion of the wavelength range, e.g., about 900 nm to about 1700 nm. Examples of such photodetectors include a silicon detector for the shorter wavelength ranges and an InGaAs or PbS detector for the longer wavelength ranges.

In some embodiments, multiple photodetectors can be positioned side-by-side for measurement and analysis, where one of the photodetectors can cover a portion of the wavelength range and another of the photodetectors can cover another portion of the wavelength range. The spectrograph components, e.g., the reflecting mirror or surface, can be designed to direct light signals to the appropriate photodetector according to the wavelengths of the signals.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to a spectrograph having multiple excitation wavelength ranges in Raman spectroscopy. The spectrograph can include a wavelength switching mechanism, which can mount multiples optical assemblies (or elements) for processing different excitation wavelength ranges and can switch between the optical assemblies according to the wavelength of an incoming light signal. In some embodiments, the incoming light signal can provide a Raman signal from an irradiated sample. The spectrograph can also include one or more photodetectors in optical communication with the optical assemblies to receive and measure light signals for generating a light spectrum. Each optical assembly can include one or more transmission gratings for angularly dispersing the incoming signal into multiple wavelengths of light within a particular wavelength range and a reflecting surface proximate to the grating(s) to reflect the multiple wavelengths and direct them to the photodetector(s) for measuring the wavelengths and generating a light spectrum.

A spectrograph according to various embodiments can advantageously cover a broad wavelength range from about 200 nm to about 1700 nm, which can cover up to 3200 $cm^{-1}$ wave numbers for any excitation wavelength, with high resolution and high optical throughput. In some instances, the spectrograph can be optimized for an excitation wavelength range from about 400 nm to about 2500 nm, if longer excitation wavelengths are preferred. A spectrograph can use optical telecommunication technology to provide an ultra-compact, reliable, portable, battery operated, handheld, and/or non-moving part analyzer. Space, cost, and power savings can be realized with this device.

It is to be understood that the device is not limited to Raman spectroscopy, but can be used for any suitable analysis capable of performing according to various embodiments.

Figure 1A:
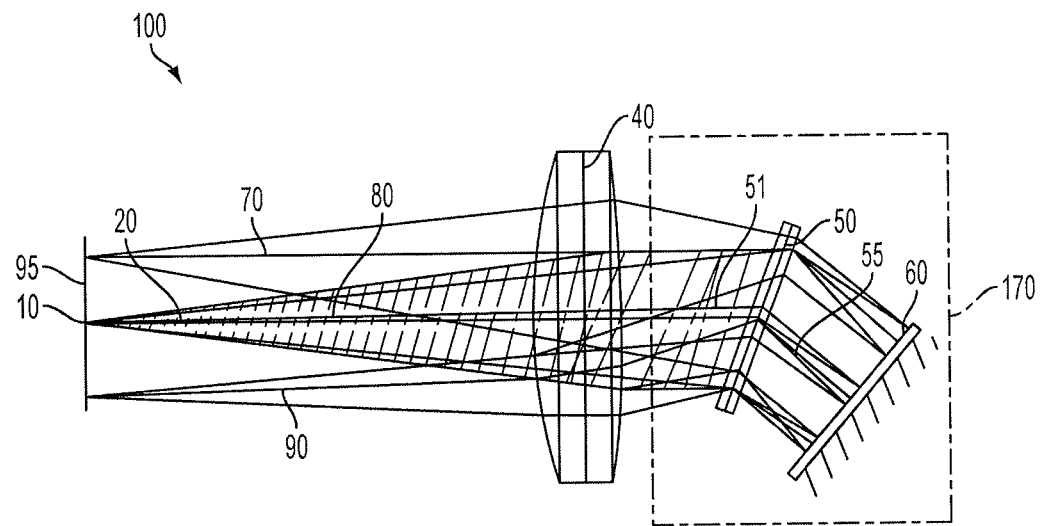
FIGS. 1A through 1C illustrate schematic representations of an exemplary spectrograph according to various embodiments.
Figure 1C:
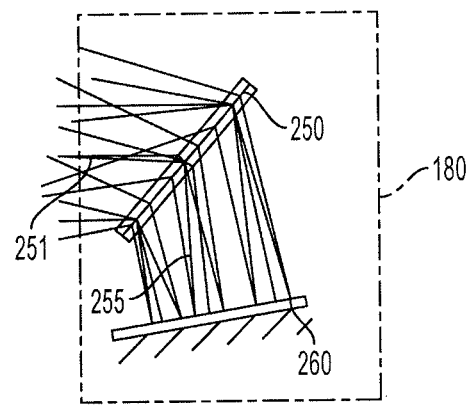
Figure 1B:
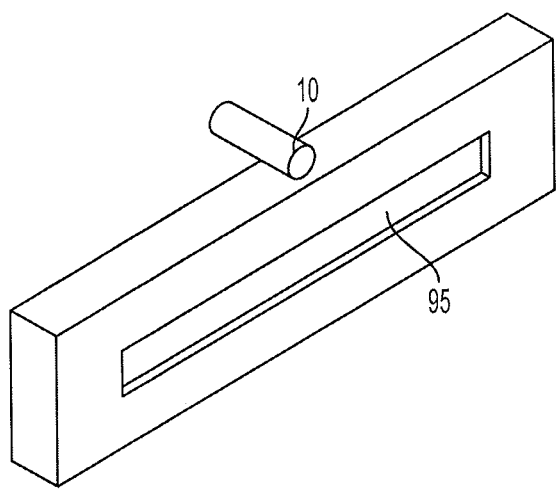

FIGS. 1A through 1C illustrate schematic representations of an exemplary spectrograph according to various embodiments. In the example of FIG. 1A, spectrograph 100 can include aperture 10, collimating, focusing lens 40, grating-mirror assembly 170, and photodetector 95. The grating-mirror assembly 170 can include transmission grating 50 and reflecting mirror 60. The spectrograph 100 can be housed in a structure that can be light-sealed and that can have its inner surfaces low-reflection-treated to substantially reduce or minimize stray light and noise.

The aperture 10 can provide a light signal to the spectrograph 100. The aperture 10 can be a pinhole, a slit, or the like through which the light signal is introduced into the spectrograph 100. In some embodiments, the pinhole can be about 50 μm in diameter and the slit can be about 2 mm high by 25 μm wide. In some embodiments, the light signal can provide a Raman signal collected from an irradiated sample over one or more wavelength ranges, such as about 530-640 nm, about 785-1050 nm, and/or about 1000-1700 nm, depending on the Raman excitation wavelength range. For example, a Raman excitation laser at 785 nm used to irradiate a sample can cause the sample to generate a Raman signal in the wavelength range of about 785-1050 nm. Descriptions of how a Raman signal can be acquired and then delivered to the aperture are found in *Raman Spectroscopy for Chemical Analysis* by Richard McCreery, and U.S. Pat. No. 5,112,127, for example.

The collimating, focusing lens 40 can collimate and collect the light signal from the aperture 10 and can focus multiple wavelengths of light returning from the grating-mirror assembly 170. The lens 40 can be designed to reduce or minimize optical aberrations and other optical anomalies that could interfere with its operation.

The transmission grating 50 of the grating-mirror assembly 170 can disperse the collimated and collected light signal from the lens 40 into multiple wavelengths within a particular wavelength range. The grating 50 can also disperse the reflected wavelengths from the reflecting mirror 60 to provide higher angular separation between the wavelengths. The grating 50 can be positioned in the spectrograph 100 to form a desired incidence angle with the light signal and the reflected wavelengths and can be designed to have a desirable pitch so as to properly disperse the light signal and the reflected wavelengths.

The reflecting mirror 60 of the grating-mirror assembly 170 can reflect the multiple wavelengths back to the grating 50. The mirror 60 can be positioned in the spectrograph 100 to optimally reflect the multiple wavelengths back through the grating 50 so as to direct the wavelengths to the photodetector.

The photodetector 95 can receive and measure the focused wavelengths of light from the lens 40. The photodetector 95 can generate output signals of measurement as a function of position(s) of the light on the photodetector. Example photodetectors can include a silicon detector, an InGaAs array detector, a PbS array detector, and a CCD array detector. The photodetector 95 can be positioned in the spectrograph 100 to receive and measure as much of the light as possible. In some embodiments, the photodetector 95 can be positioned at the focal plane of the lens 40. For example, FIG. 1B illustrates the light input source 10 and the photodetector 95 positioned proximate to each other at or about the focal plane of the lens 40.

The grating-mirror assembly 170 of FIG. 1A can be used when the light signal is within a particular wavelength range in the spectrograph 100. Additionally, the assembly 170 can be used when the light signal has a broad wavelength range, but desired information, e.g., a Raman signal, within the light signal is within a particular wavelength range in the spectrograph 100. When the light signal or the desired information within the light signal is within other wavelength ranges, the assembly 170 can be switched with a different assembly according to various embodiments.

FIG. 1C illustrates an exemplary grating-mirror assembly that can switch with the assembly of FIG. 1A. In the example of FIG. 1C, grating-mirror assembly 180 can include transmission grating 250 and reflecting mirror 260. The grating 250 and the mirror 260 can perform the same as the grating 50 and the mirror 60 of FIG. 1A. However, because the grating-mirror assembly 180 of FIG. 1C is used for a different wavelength range, the positioning of the grating 250 and the mirror 260 and the grating pitch can be different to accommodate the different wavelength range. The grating 250 can be positioned in the spectrograph 100 to form a desired incidence angle with the light signal and the reflected wavelengths from the mirror 260 and can be designed to have a desirable pitch so as to properly disperse the light signal and the reflected wavelengths. Similarly, the mirror 260 can be positioned in the spectrograph 100 to optimally reflect the multiple wavelengths back through the grating 250 to the photodetector 95.

The assemblies 170, 180 can be switched either manually, for example by hand or with a manual lever, or electrically, for example using an electric motor or electric slide. The switching motion can be translational, rotational, or both. In some embodiments, the assemblies 170, 180 can be mounted on a movable platform for easy switching.

In operation, the spectrograph 100 can input light signal 20 through the aperture 10. In some embodiments, the light signal 20 can be white light or multi-wavelength light within a particular wavelength range and/or can include desired information within the particular wavelength range. The light signal 20 can be collected by the collimating, focusing lens 40 and substantially collimated as the signal passes through the lens. The collimated signal 20 can impinge on the transmission grating 50 at incidence angle 51 and be dispersed by the grating into multiple wavelengths 55 of light. The multiple wavelengths 55 can be reflected by the reflecting mirror 60 to return to the grating 50. The reflected wavelengths 55 can be further dispersed by the grating 50 to provide higher angular separation between the wavelengths. The separated wavelengths can be focused by the lens 40 as the wavelengths pass through the lens into wavelengths 70, 80, 90 of light transmitted at different angles to the photodetector 95. The light 70, 80, 90 can be measured by the photodetector 95 and processed to provide a light spectrum.

If it is determined that a second light signal 20 has a different wavelength range or includes desired information within the different wavelength range, where the wavelength range is compatible with the grating-mirror assembly 180, the grating-mirror assembly 170 can be switched with the grating-mirror assembly 180 prior to or during inputting of the second light signal. The second light signal 20 can then be processed, in a similar manner to that described above, using the aperture 10, the collimating, focusing lens 40, the transmission grating 250, the reflecting mirror 260, and the photodetector 95. The grating 250 can be positioned to form incidence angle 251 with the second light's collimated signal 20 and to disperse multiple wavelengths 255 of light. The mirror 260 can be positioned to reflect the multiple wavelengths 255 to return to the grating 250 for further dispersion. The grating 250 and the mirror 260 of the assembly 180 can be positioned at different angles relative to each other and at different angles relative to the other spectrograph components compared to the grating 50 and the mirror 60 positions of the assembly 170. In additional or alternatively, the grating 250 and the mirror 260 of the assembly 180 can be spaced apart relative to each other and spaced apart relative to the other spectrograph components differently compared to the grating 50 and the mirror 60 positions of the assembly 170.

Suppose that the light signal provides a Raman signal. For example, a Raman excitation laser at 532 nm can irradiate a sample to generate a Raman signal of white light having a wavelength range of about 532-640 nm. To optimally process this Raman signal, a slit can be chosen as the aperture with a height of about 2 mm and a width of about 25 µm; a collimating, focusing lens can be chosen to have a focal length of about 100 mm; a CCD detector can be chosen as the photodetector with about 2048 pixels, a pixel size of about 14 um, and a detector size of about 28 mm and can be positioned about 100 mm from the lens at or around the focal plane; and a transmission grating can be chosen with a pitch of about 1184.48 lines per mm and can be positioned to form an incidence angle with the Raman signal at about 20.37 degrees.

Similarly, a Raman excitation laser at 785 nm can irradiate a sample to generate a Raman signal of white light having a wavelength range of about 785-1050 nm. To optimally process this Raman signal, a second transmission grating can be chosen with a pitch of about 509.88 lines per mm and can be positioned to form an incident angle with the Raman signal at about 13.54 degrees. This second transmission grating, along with its mirror, can be switched with the previous transmission grating, along with its mirror, when the wavelength range is about 785-1050 nm. With suitable spectrograph component choices, such as those above, a high spectral resolution of about 5 $cm^{-1}$ can be obtained in the device. Additionally, a high optical throughput can be obtained in the device by seamlessly and effortlessly switching between assemblies.

It is to be understood that the spectrograph components are not limited to those described above, but can include different light input source sizes and types, lens focal lengths, grating pitches and positions, and photodetector size and type, in any suitable combinations according to the needs of the device.

It is further to be understood that the different wavelength ranges dispersed by the assemblies can coincide, overlap, or be separate according to the needs of the device.

Figure 2A:
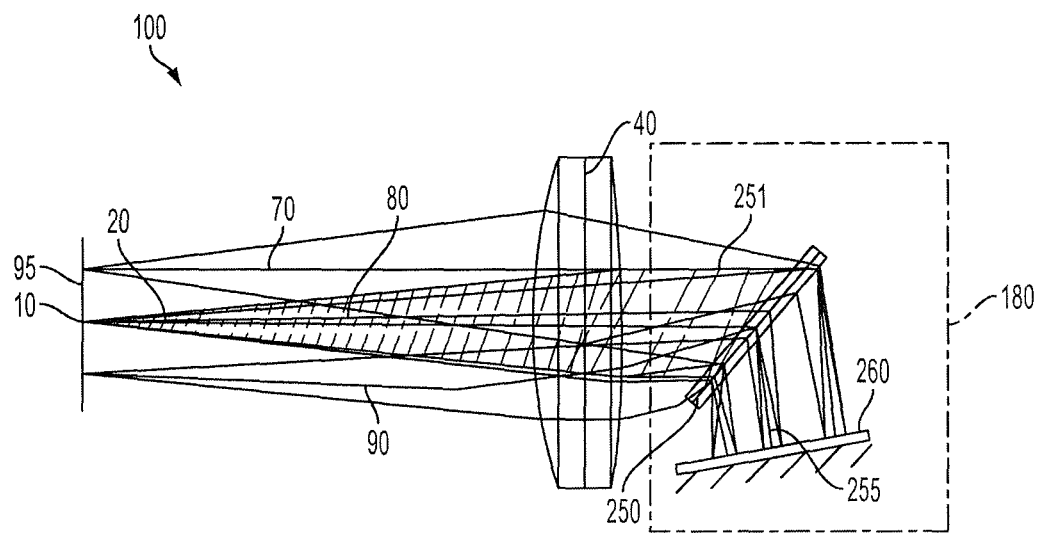
FIGS. 2A through 2C illustrate schematic representations of another exemplary spectrograph according to various embodiments.
Figure 2C:
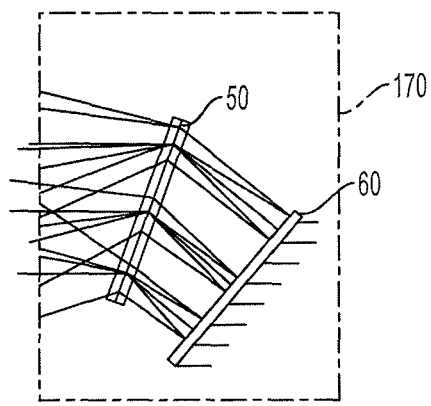
Figure 2B:
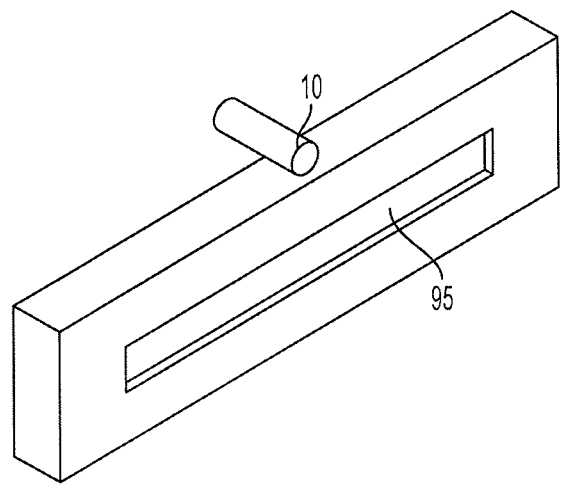

FIGS. 2A through 2C illustrate schematic representations of the exemplary spectrograph of FIGS. 1A through 1C with the assemblies switched according to various embodiments. In the example of FIG. 2A, spectrograph 100 can include the aperture 10, the collimating, focusing lens 40, the grating-mirror assembly 180, and the photodetector 95. The grating-mirror assembly 180 can include the transmission grating 250 and the reflecting mirror 260. In the example of FIG. 2B, the aperture 10 and the photodetector 95 can be proximate to each other at or around the focal plane of the lens 40. In the example of FIG. 2C, the grating-mirror assembly 170 can be switched with the grating-mirror assembly 180 to form the configuration shown in FIG. 1A, for example.

In operation, the spectrograph can perform similar to that of FIGS. 1A through 1C described above.

Figure 3A:
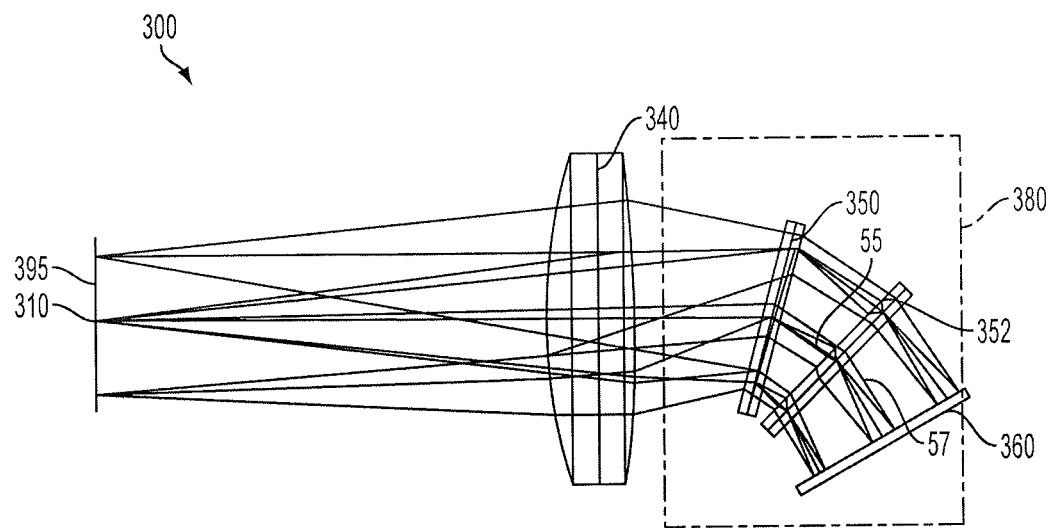
FIGS. 3A through 3C illustrate schematic representations of another exemplary spectrograph according to various embodiments.
Figure 3C:
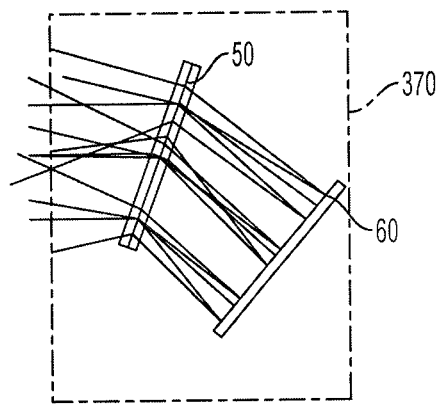
Figure 3B:
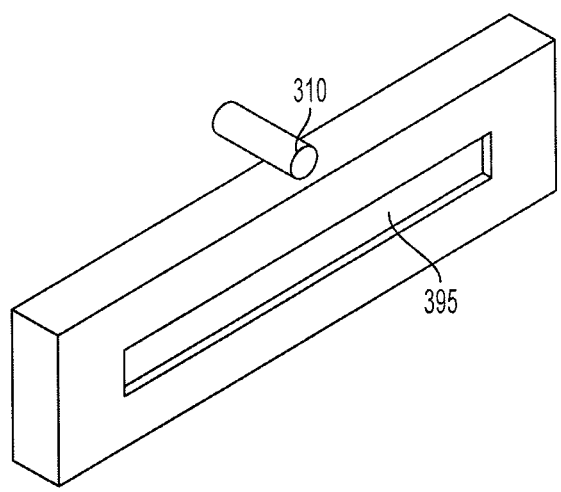

FIGS. 3A through 3C illustrate schematic representations of another exemplary spectrograph according to various embodiments. In the example of FIG. 3A, spectrograph 300 can include aperture 310, collimating, focusing lens 340, grating-mirror assembly 380, and photodetector 395. The grating-mirror assembly 380 can include first transmission grating 350, second transmission grating 352, and reflecting mirror 360. The spectrograph 300 can be housed in a structure that can be light-sealed and that can have its inner surfaces low-reflection-treated to substantially reduce or minimize stray light and noise.

The aperture 310, the collimating, focusing lens 340, and the photodetector 395 can be the same as or similar to those described in FIGS. 1A through 2C.

The first transmission grating 350 of the grating-mirror assembly 380 can disperse the collimated light signal from the lens 340 into multiple wavelengths within a particular wavelength range. The second transmission grating 352 of the grating-mirror assembly 380 can further disperse the multiple wavelengths of light from the first grating 350 within the wavelength range. The second grating 352 can also disperse the reflected wavelengths from the reflecting mirror 360 to provide higher angular separation between the wavelengths. The first grating 350 can further disperse the reflected wavelengths from the second grating 352 to provide higher angular separation between the wavelengths. The gratings 350, 352 can be positioned in the spectrograph 300 to form desired incidence angles with the light passing through and can be designed to have desirable pitches so as to properly disperse the passing light. The gratings 350, 352 can have the same or different incidences angles and/or the same or different pitches according to the needs of the device. The two gratings 350, 352 can advantageously increase the dispersion of the light signal, thereby reducing the focal length of the lens 340. As a result, the photodetector 395 can be positioned at or about a focal plane that is closer to the lens 240, such that the size of the spectrograph 300 is reduced.

The reflecting mirror 360 of the grating-mirror assembly 380 can reflect the multiple wavelengths back to the second grating 352. The mirror 360 can be positioned in the spectrograph 300 to optimally reflect the multiple wavelengths back through the second grating 352 so as to direct the wavelengths to the photodetector 395.

FIG. 3B illustrates the aperture 310 and the photodetector 395 positioned proximate to each other at or about the focal plane of the lens 340.

The grating-mirror assembly 380 of FIG. 3A can be used when the light signal is within a particular wavelength range in the spectrograph 300. When the light signal is within other wavelength ranges, the assembly 380 can be switched with a different assembly according to various embodiments. FIG. 3C illustrates an exemplary grating-mirror assembly that can switch with the assembly of FIG. 3A. The assembly 370 of FIG. 3C is the same as or similar to the assembly 170 of FIGS. 1A through 2C, for example.

The assemblies 370, 380 can be switched either manually, for example by hand or with a manual lever, or electrically, for example using an electric motor or electric slide. The switching motion can be translational, rotational, or both.

In operation, the spectrograph 300 can perform similar to the spectrograph 100 of FIGS. 1A through 2C, with the following differences. The collimated signal from the lens 340 can be dispersed by the first transmission grating 350 into multiple wavelengths 55 of light. The multiple wavelengths 55 can be further dispersed by the second transmission grating 352 into multiple wavelengths 57 of light. The multiple wavelengths 57 can be reflected by the reflecting mirror 360 to return to the second grating 352.

If it is determined that a second light signal has a different wavelength range and/or includes desired information within the different wavelength range, where the different wavelength range is compatible with the grating-mirror assembly 370, the grating-mirror assembly 380 can be switched with the grating-mirror assembly 370 prior to or during inputting of the second light signal. The second light signal can then be processed, in a similar manner to that described above, using the aperture 310, the collimating, focusing lens 340, the transmission grating 50, the reflecting mirror 60, and the photodetector 95. The single grating 50 can be positioned to form an incidence angle with the second light's collimated signal and to disperse multiple wavelengths of light. The mirror 60 can be positioned to reflect the multiple wavelengths through the grating to the photodetector. The grating 50 and the mirror 60 of the assembly 370 can be positioned at different angles relative to each other and at different angles relative to the other spectrograph components compared to the gratings 350, 352 and the mirror 360 positions of the assembly 380. In additional or alternatively, the grating 50 and the mirror 60 of the assembly 370 can be spaced apart relative to each other and spaced apart relative to the other spectrograph components differently compared to the gratings 350, 352 and the mirror 360 positions of the assembly 380.

Suppose that the light signal provides a Raman signal. For example, a Raman excitation laser at 532 nm can irradiate a sample to generate a Raman signal of white light having a wavelength range of about 532-640 nm. To optimally process this Raman signal, a slit can be chosen as the aperture with a height of about 2 mm and a width of about 25 μm; a collimating, focusing lens can be chosen to have a focal length of about 50 mm; a CCD detector can be chosen as the photodetector with about 2048 pixels, a pixel size of about 14 um, and a detector size of about 28 mm and can be positioned about 50 mm from the lens at or around the focal plane; and identical first and second transmission gratings can be chosen with a pitch of about 635.63 lines per mm and can be positioned to form incidence angles with the Raman signal at about 10.74 degrees.

Similarly, a Raman excitation laser at 785 nm can irradiate a sample to generate a Raman signal of white light having a wavelength range of about 785-1050 nm. To optimally process this Raman signal, a third transmission grating can be chosen with a pitch of about 509.88 lines per mm and can be positioned to form an incidence angle with the Raman signal at about 13.54 degrees. This third transmission grating, along with its mirror, can be switched with the previous pair of transmission gratings, along with their mirror, when the wavelength range is about 785-1050 nm. With suitable spectrograph component choices, such as those above, a high spectral resolution of about 5 $cm^{-1}$ can be obtained in the device. Additionally, a high optical throughput can be obtained in the device by seamlessly and effortlessly switching between assemblies.

It is to be understood that the spectrograph components are not limited to those described above, but can include different light input source sizes and types, lens focal lengths, grating pitches and positions, and photodetector size and type, in any suitable combinations according to the needs of the device.

Figure 4A:
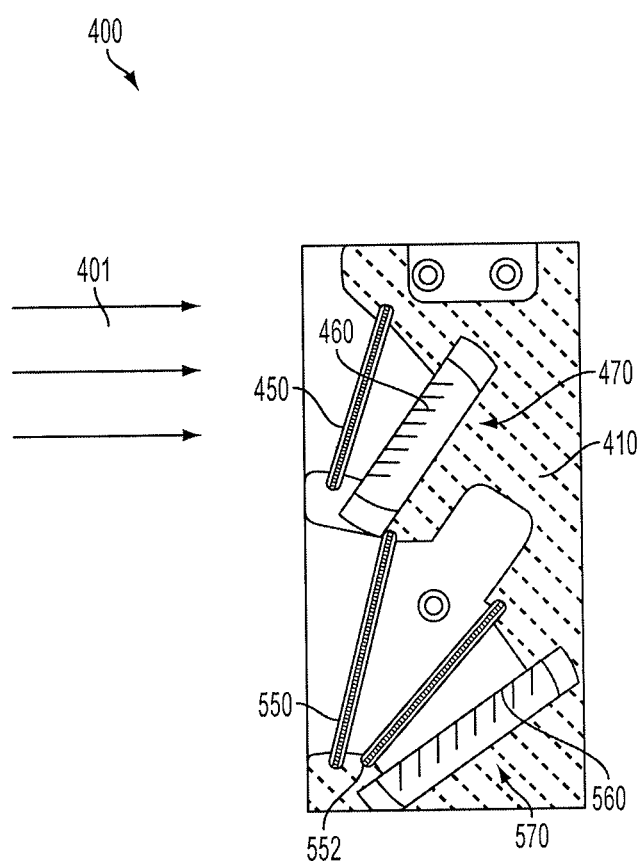
FIGS. 4A and 4B illustrate respective cross-sectional and three-dimensional representations of an exemplary wavelength switching mechanism of a spectrograph according to various embodiments.

FIG. 4A illustrates a cross-sectional representation of an exemplary wavelength switching mechanism of a spectrograph according to various embodiments. In the example of FIG. 4A, wavelength switching mechanism 400 can have a platform which includes movable portion 410 having first grating-mirror assembly 470 and second grating-mirror assembly 570 mounted thereon. In some embodiments, the assemblies 470, 570 can be fixably mounted on the movable portion 410. In some embodiments, the assemblies 470, 570 can be detachably mounted on the movable portion 410. In some embodiments, the mounting positions can be pre-fixed. In some embodiments, the mounting positions can be adjustable. The movable portion 410 can slide, rotate, or otherwise move to switch between the two assemblies 470, 570 to align with incoming light signal 401. The movable portion 410 can be moved manually, for example by hand or manual lever, or electrically, for example by electric motor or electric slide. The platform can be made of metal, polymer, and any other material capable of providing thermal stability and mechanical strength for mounting and moving grating-mirror assemblies according to various embodiments.

The first assembly 470 can include transmission grating 450 for dispersing the light 401 into multiple wavelengths within a first wavelength range and reflecting mirror 460 for reflecting the multiple wavelengths of light back to the grating for further processing according to various embodiments. The second assembly 570 can include first transmission grating 550 and second transmission grating 552 for dispersing the light 401 into multiple wavelengths within a second wavelength range and reflecting mirror 560 for reflecting the multiple wavelengths of light back to the gratings for further processing according to various embodiments. The first assembly 470 can be the same as or similar to the assemblies in FIGS. 1A through 2C and 3C, for example. The second assembly 570 can be the same as or similar to the assembly in FIG. 3A, for example.

Figure 4B:
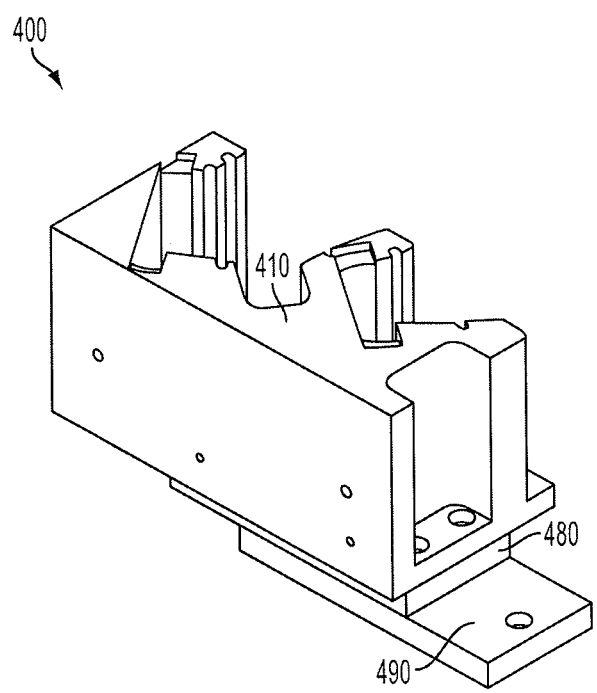
Figure 5A:
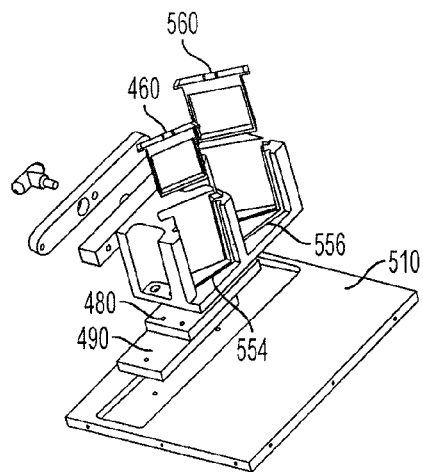
FIGS. 5A through 5E illustrate three-dimensional representations of an exemplary wavelength switching mechanism of a spectrograph according to various embodiments.
Figure 5B:
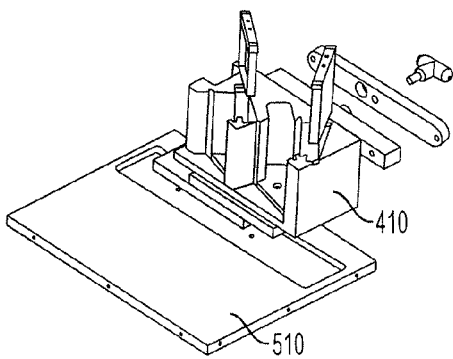
Figure 5C:
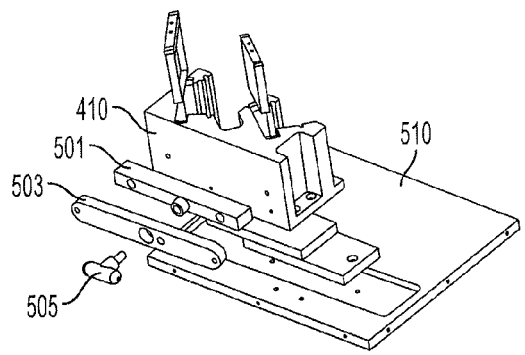
Figure 5D:
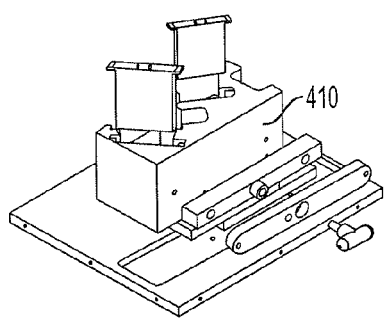
Figure 5E:
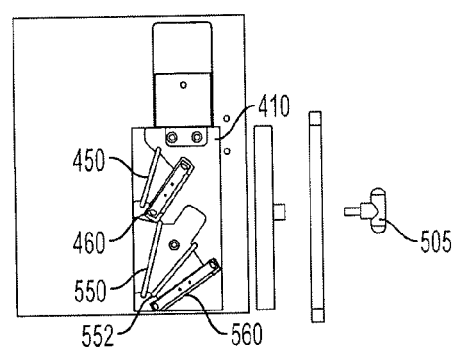

FIG. 4B illustrates a three-dimensional representation of the exemplary wavelength switching mechanism of FIG. 4A according to various embodiments. In the example of FIG. 4B, the wavelength switching mechanism's platform can include the movable portion 410 for mounting the grating-mirror assemblies (not shown), slide portion 480 attached to the movable portion, and base portion 490 having a sliding area thereon for seating and moving the slide portion and hence the movable portion. The slide portion 480 can be moved along the base portion manually or electrically. The base portion 490 can be fixed to an underlying surface of a spectrograph as described above, for example. In some embodiments, the movable portion 410 and the slide portion 480 can be formed as a single movable unit.

In some embodiments, the slide portion 480 can be replaced with a rotating portion attached to the movable portion 410 for rotating the movable portion into position. As such, the base portion 490 can have a pivot point thereon for seating and rotating the rotating portion and hence the movable portion. And the movable portion 410 can have rotating mounts for the grating-mirror assemblies to rotate the assemblies into position when the movable portion rotates. In some embodiments, the movable portion 410 and the rotating portion can be formed as a single movable unit.

FIGS. 5A through 5E illustrate exploded views of the exemplary wavelength switching mechanism of FIGS. 4A and 4B according to various embodiments. In the examples of FIGS. 5A through 5E, the movable portion 410 of the wavelength switching mechanism 400 can include grooves 554 along the sides and bottom of a first recess for mounting the mirror 460 and the corresponding transmission grating 450 in place and grooves 556 along the sides and bottom of a second recess for mounting the mirror 560 and the two corresponding transmission gratings 550, 552 in place. The mechanism 400 can be housed in a light-sealed and/or low-reflection-treated structure (not shown) to substantially reduce or minimize stray light and noise. The base portion 490 can fix the mechanism 400 to underlying surface 510 of the structure. The mechanism 400 can include a movable tool for manually moving the movable portion 410 in order to switch the grating-mirror assemblies according to various embodiments. The movable tool can include handle 505, exterior attachment bar 503, and interior attachment bar 501. The interior bar 501 can attach to the movable portion 410 inside the structure. The exterior bar 503 can attach to the interior bar 201 through the structure wall. The handle 505 can fix the exterior bar 501 and the interior bar 503 in place through a via. A user can then grasp the handle and move the handle along the structure wall, thereby moving the movable portion and the mounted assemblies according to various embodiments. Other movable tools can also be used to manually slide, rotate, or otherwise move the mechanism 400. Other movable tools can also be used to electrically slide, rotate, or otherwise move the mechanism 400.

Figure 6:
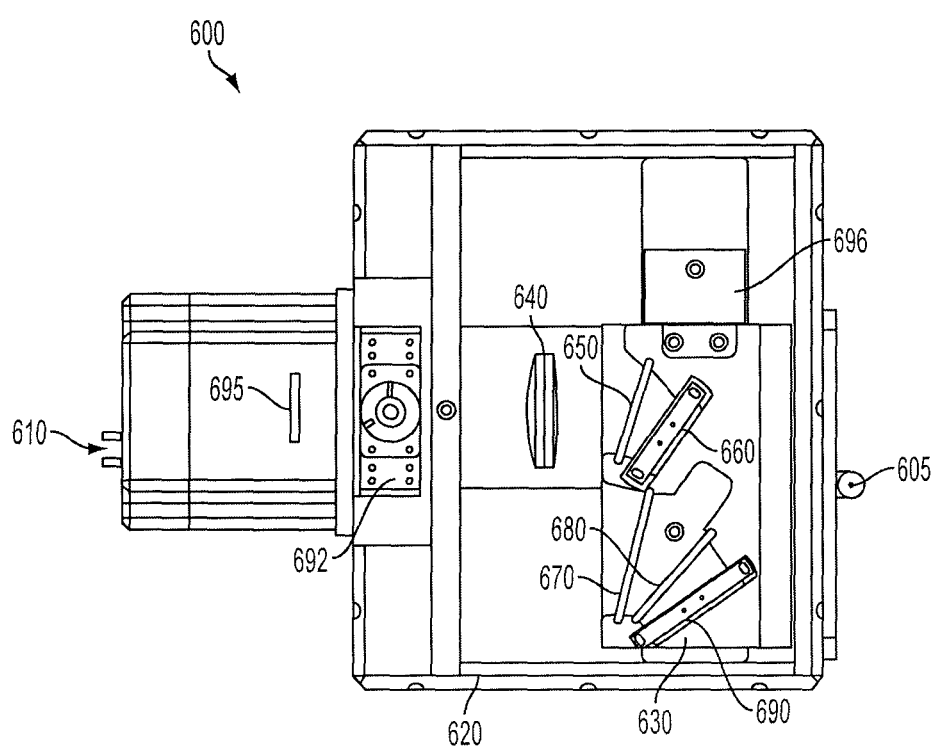
FIG. 6 illustrates a cross-sectional representation of an exemplary wavelength switching mechanism of a spectrograph according to various embodiments.

FIG. 6 illustrates a cross-sectional representation of an exemplary spectrograph that can include a wavelength switching mechanism according to various embodiments. In the example of FIG. 6, spectrograph 600 can include light input source 610, photodetector 695, lens assembly 640, and wavelength switching mechanism 630 housed in a light-sealed and/or low-reflection-treated structure 620. The light input source 610 can provide a light signal. The photodetector 695 can measure multiple wavelengths of light to determine a light spectrum. In some embodiments, the photodetector 695 can be a high sensitivity CCD array and can have an electrically operated thermal cooling mechanism. In some embodiments, the spectrograph 600 can include adjuster 692 to make fine mechanical adjustments in all three dimensions to the photodetector 695 for proper measurement of the multiple wavelengths of light. The lens assembly 640 can collimate and focus light. In some embodiments, the lens assembly 640 can include one or more lenses achromatically corrected to perform over the various wavelength ranges, for example, ranges from about 200 to 1700 nm, more particularly, from about 500 to 1100 nm. The wavelength switching mechanism 630 can switch grating-mirror assemblies according to a wavelength of incoming light to properly disperse the light into multiple wavelengths within a particular wavelength range. The spectrograph 600 can process multiple wavelength ranges of light according to various embodiments.

The wavelength switching mechanism 630 can include a first grating-mirror assembly for dispersing light within a first wavelength range and a second grating-mirror assembly for dispersing light within a second wavelength range. The wavelength ranges can include ranges from about 200 to 1700 nm, more particularly, from about 500 to 1100 nm, for example. The first assembly can include transmission grating 650 for dispersing light into multiple wavelengths and reflecting mirror 660 for reflecting the dispersed wavelengths back through the grating to the photodetector. The second assembly can include transmission gratings 670, 680 for dispersing light twice in succession into multiple wavelengths and reflecting mirror 690 for reflecting the dispersed wavelengths back through the gratings to the photodetector. The mechanism 630 can move along base portion 696 to switch the mounted assemblies to align with light from the lens assembly 640. The mechanism 630 can be moved manually using handle 605. In some embodiments, the mechanism 630 can be moved electrically (not shown) using an electric motor or electric slide, for example.

It is to be understood that the wavelength switching mechanism described above is not limited to the configurations illustrated herein, but can include additional components and/or other configurations according to various embodiments. For example, the mechanism can include more than two grating-mirror assemblies as needed. Also different types of assemblies can be used to process different wavelength ranges.

Figure 7A:
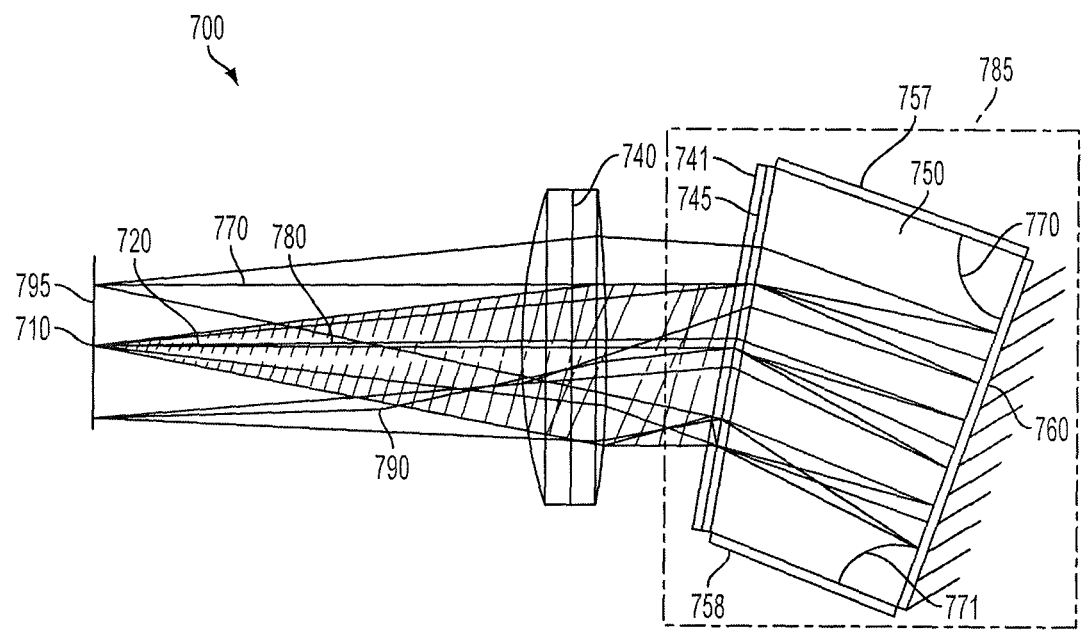
FIGS. 7A through 7C illustrate schematic representations of another exemplary spectrograph according to various embodiments.
Figure 7C:
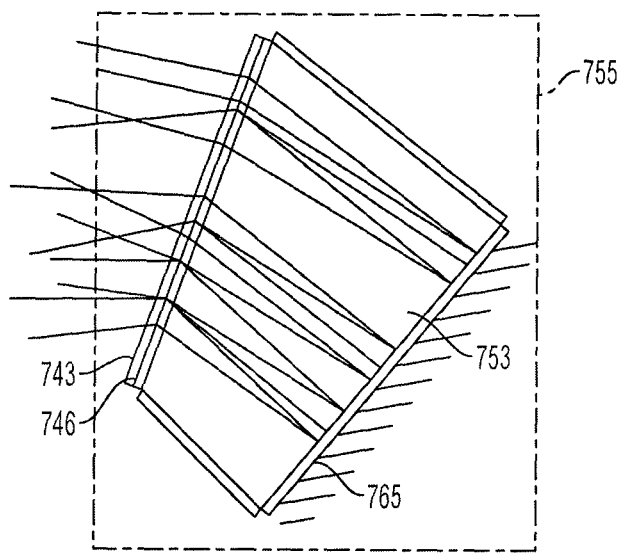
Figure 7B:
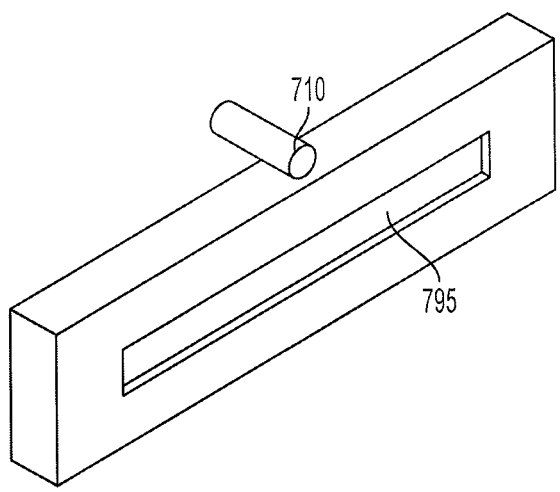

FIGS. 7A through 7C illustrate schematic representations of another exemplary spectrograph according to various embodiments. In the example of FIG. 7A, spectrograph 700 can include aperture 710, collimating, focusing lens 740, grating assembly 785, and photodetector 795. The grating assembly 785 can include transmission grating 745 disposed between first substrate 741 and second substrate 750. The grating 745 can be preferably integrated with the substrates 741, 750 using low scattering glasses of the same refractive index, e.g., the substrates can be made from a same or different type of optical glasses (such as BK7, quartz, and the like). Refractive index matching optical adhesives can be applied around the edges of the substrates 741, 750 to seal the grating 745 therebetween. The surfaces of the first substrate 741 can be polished and preferably coated with an anti-reflective coating to enhance effective passage of light. The grating 745 can be a transmission holographic element (having the same characteristics as the gratings previously described) made by holographic techniques utilizing photosensitive media having sufficient thickness and preferably a volume DCG (dichromate gelatin) hologram.

Surface 760 of the second substrate 750 can form a reflecting mirror to reflect dispersed wavelengths received from the grating 745. To form the reflective mirror, surface 760 can be polished and coated with a highly reflective coating, and cut and polished to an angular orientation at which light reflected from the surface reverses the light path at some preferred angular directions in accordance with the light's wavelengths. Other surfaces 757, 758 of the second substrate 750 can be polished and coated with highly absorbing paint for a particular wavelength range in order to absorb any stray light. The second substrate 750 can be preferably cut with specific corner angles 770. 771 so as to substantially reduce or minimize any internal multi-reflections from the surfaces 757, 758 returning to the lens 740. U.S. Pat. No. 6,275,630 describes a similar grating assembly, the contents of which are incorporated by reference herein for all purposes. The grating assembly 785 can advantageously substantially reduce or minimize stray light and thereby inter-wavelength crosstalk. Moreover, because the grating assembly 785 can be an integrated structure, mechanical and environmental (thermal, stress, etc.) responses of the assembly can be more easily controlled.

The aperture 710, the collimating, focusing lens 740, and the photodetector 795 can be the same as or similar to those described in FIGS. 1A through 3C, for example.

The grating 745 of the grating assembly 785 can disperse the collimated light signal from the lens 740 into multiple wavelengths within a particular wavelength range. The grating 745 can also disperse the reflected wavelengths from the reflecting surface 760 to provide higher angular separation between the wavelengths. The grating 745 can be positioned in the spectrograph 700 to form a desired incidence angle with the light signal and the reflected wavelengths so as to properly disperse the light signal and the reflected wavelengths.

The reflecting surface 760 of the grating assembly 785 can reflect the multiple wavelengths back through the grating 745 to the photodetector 795. The surface 760 can be formed in the spectrograph 700 to optimally reflect the multiple wavelengths.

FIG. 7B illustrates the aperture 710 and the photodetector 795 positioned proximate to each other at or about the focal plane of the lens 740.

The grating assembly 785 of FIG. 7A can be used when the light signal is within a particular wavelength range in the spectrograph 700. Additionally, the assembly 785 can be used when desired information within the light signal is within the particular wavelength range in the spectrograph 700. When the light signal and/or desired information within the light signal is within other wavelength ranges, the assembly 785 can be switched with a different assembly according to various embodiments. FIG. 7C illustrates an exemplary grating assembly that can switch with the assembly of FIG. 7A.

In the example of FIG. 7C, grating assembly 755 can include transmission grating 746 disposed between first substrate 743 and second substrate 753. The grating 746 can be preferably integrated with the substrates 743, 753. Surface 765 of the second substrate 753 can be polished and coated to form a reflecting mirror. Other aspects of the grating assembly 755 can be formed in the same or similar manner as the assembly 785 of FIG. 7A. The grating assembly 755 can perform the same as the grating assembly 785 of FIG. 7A. However, because the grating assembly 755 of FIG. 7C is used for a different wavelength range, the positioning of the grating 746 and the reflecting surface 765 can be different to accommodate the different wavelength range. The grating 746 can be positioned in the spectrograph 700 to form a desired incidence angle with the light signal and the reflected wavelengths from the reflecting surface 760 so as to properly disperse the light signal and the reflected wavelengths. Similarly, the surface 760 can be formed in the spectrograph 700 to optimally reflect the multiple wavelengths back through the grating 746 to the photodetector 795.

The assemblies 755, 785 can be switched either manually, for example by hand or with a manual lever, or electrically, for example using an electric motor or electric slide. The switching motion can be translational, rotational, or both.

In operation, similar to the spectrographs of FIGS. 1A through 3C, the spectrograph 700 of FIGS. 7A through 7C can input light signal 720 through the aperture 710. In some embodiments, the light signal 720 can be white light or multi-wavelength light within a particular wavelength range. In some embodiments, the light signal 720 can provide a Raman signal. The light signal 720 can be collected by the collimating, focusing lens 740 and substantially collimated and collected as the signal passes through the lens. The collimated signal 720 can impinge on the transmission grating 745 at an incidence angle and be dispersed by the grating into multiple wavelengths of light. The multiple wavelengths can travel through the substrate 750 to the reflecting surface 760 and be reflected by the surface to return to the grating 745. The reflected wavelengths can be further dispersed by the grating 745 to provide higher angular separation between the wavelengths. The separated wavelengths can be focused by the lens 740 as the wavelengths pass through the lens into wavelengths 770, 780, 790 of light transmitted at different angles to the photodetector 795. The light 770, 780, 790 can be measured by the photodetector 795 and processed to provide a light spectrum.

If it is determined that a second light signal 720 has a different wavelength range and/or includes desired information within the light signal within the different wavelength range, where the wavelength range is compatible with the grating assembly 755, the grating assembly 785 can be switched with the grating assembly 755 prior to or during inputting of the second light signal. The second light signal 720 can then be processed, in a similar manner to that described above, using the aperture 710, the collimating, focusing lens 740, the transmission grating 746, the reflecting surface 765, and the photodetector 795. The grating 746 can be positioned to form an incidence angle with the second light's collimated or adjusted signal and to disperse multiple wavelengths of light. The surface 765 can be formed to reflect the multiple wavelengths through the grating to the photodetector 795. The grating 746 and the surface 765 of the assembly 755 can be positioned at different angles relative to each other and at different angles relative to the other spectrograph components compared to the grating 745 and the surface 760 positions of the assembly 785. In additional or alternatively, the grating 746 and the surface 765 of the assembly 755 can be spaced apart relative to each other and spaced apart relative to the other spectrograph components differently compared to the grating 745 and the surface 760 positions of the assembly 785.

It is to be understood that the spectrograph components are not limited to those described above, but can include different light input source sizes and types, lens focal lengths, grating and substrate size, cut, and coating, and photodetector size and type, in any suitable combinations according to the needs of the device.

It is further to be understood that the different wavelength ranges dispersed by the assemblies can coincide, overlap, or be separate according to the needs of the device.

Figure 8A:
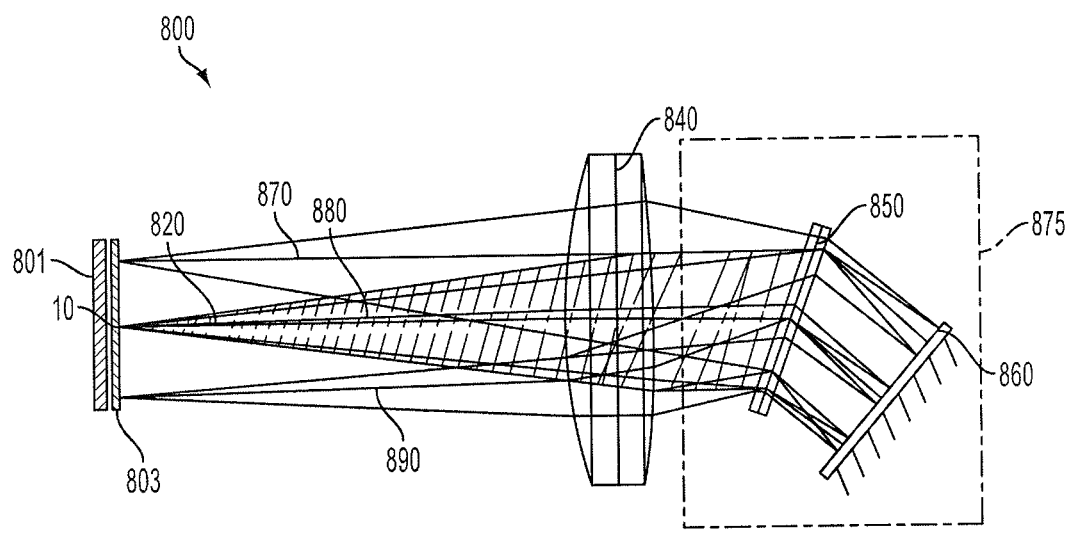
FIGS. 8A through 8C illustrate schematic representations of another exemplary spectrograph having a stacked multiple detector configuration according to various embodiments.
Figure 8C:
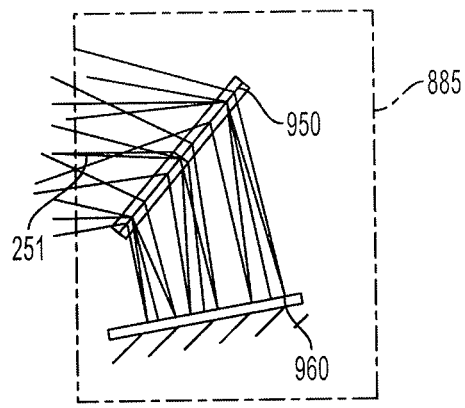
Figure 8B:
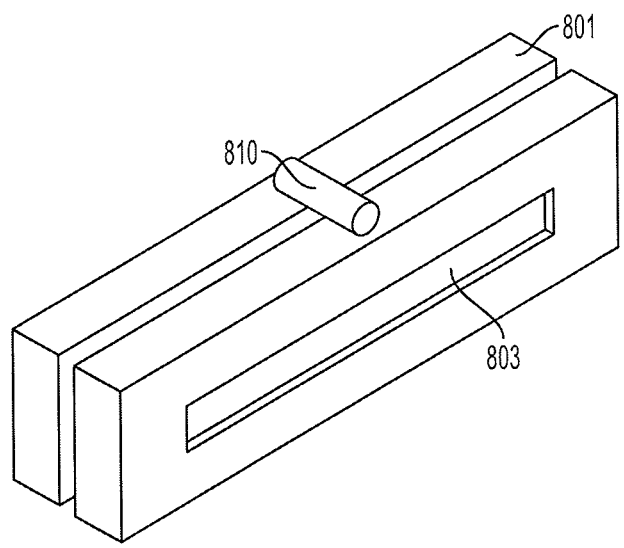

FIGS. 8A through 8C illustrate schematic representations of another exemplary spectrograph having a stacked multiple photodetector configuration according to various embodiments. In the example of FIG. 8A, spectrograph 800 can include aperture 810, collimating, focusing lens 840, grating-mirror assembly 875, first photodetector 801, and second photodetector 803. The grating-mirror assembly 875 can include transmission grating 850 and reflecting mirror 860. The spectrograph 800 can be housed in a structure that can be light-sealed and that can have its inner surfaces low-reflection-treated to substantially reduce or minimize stray light and noise.

The aperture 810, the collimating, focusing lens 840, and the grating-mirror assembly 875 can be the same as or similar to those described in FIGS. 1A through 3C. In some embodiments, the light signal from the aperture 810 can provide a Raman signal.

The photodetectors 801, 803 can be in a stacked configuration and can be sensitive to different wavelength ranges. For example, one of the photodetectors can be sensitive to a wavelength range of about 200-1100 nm, such as a silicon detector, and another of the photodetectors can be sensitive to a wavelength range of about 900-1700 nm, such as an InGaAs detector array or a PbS detector array. Multiple photodetectors can advantageously cover a wide wavelength range without having to change out or reposition the photodetectors, which can be a cost savings. Moreover, the photodetectors can be in close proximity so as to share cooling mechanisms.

FIG. 8B illustrates the aperture 810 and the photodetectors 801, 803 positioned proximate to each other at or about the focal planes of the lens 840. The photodetector 803 can be positioned at a closer focal plane to measure shorter wavelength ranges. Whereas, the photodetector 801 can be positioned at a farther focal plane to measure longer wavelength ranges. The position and radius of the mirror 860 can be designed to ensure that light is properly focused at the focal planes so as to be measured by the appropriate photodetector. In some embodiments, the mirror 860 can be a flat mirror.

FIG. 8C illustrates grating-mirror assembly 885, having transmission grating 950 and reflecting mirror 960, that can be switched with the grating-mirror assembly 875 according to various embodiments when the light signal is within a wavelength range compatible with the assembly 885.

In operation, the spectrograph 800 can perform similar to the spectrographs of FIGS. 1A through 3C, with the following differences. When the multiple wavelengths 870, 880, 890 of light are transmitted from the lens 840 to the photodetectors 801, 803, the photodetector sensitive to the wavelengths can measure the wavelengths to generate a light spectrum. The other photodetector can be virtually invisible to the wavelengths.

It is to be understood that the spectrograph components are not limited to those described above, but can include different light input source sizes and types, lens focal lengths, grating pitches and positions, and photodetector size and type, in any suitable combinations according to the needs of the device.

Figure 9A:
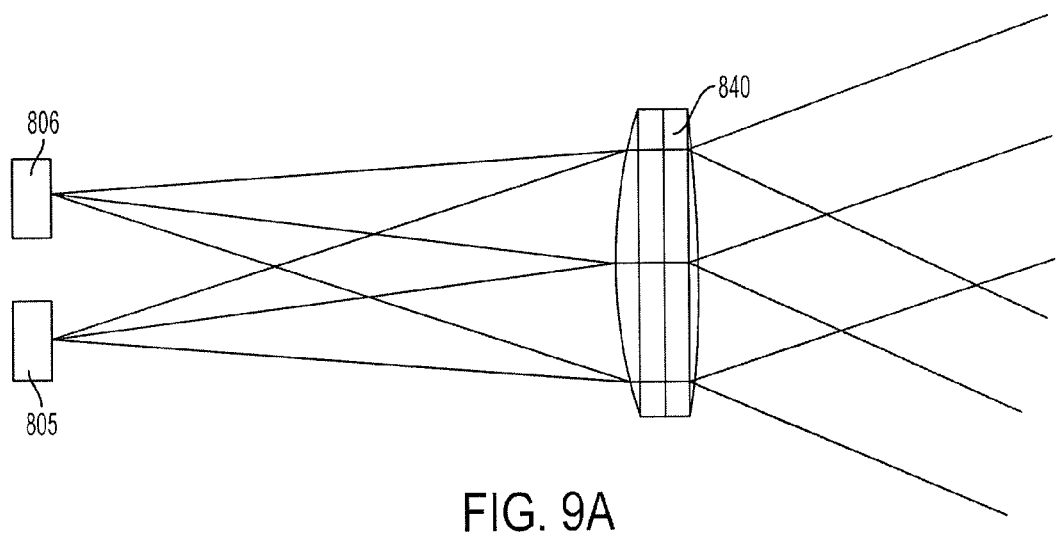
FIGS. 9A and 9B illustrate a schematic representation of another exemplary spectrograph having a side-by-side multiple detector configuration according to various embodiments.
Figure 9B:
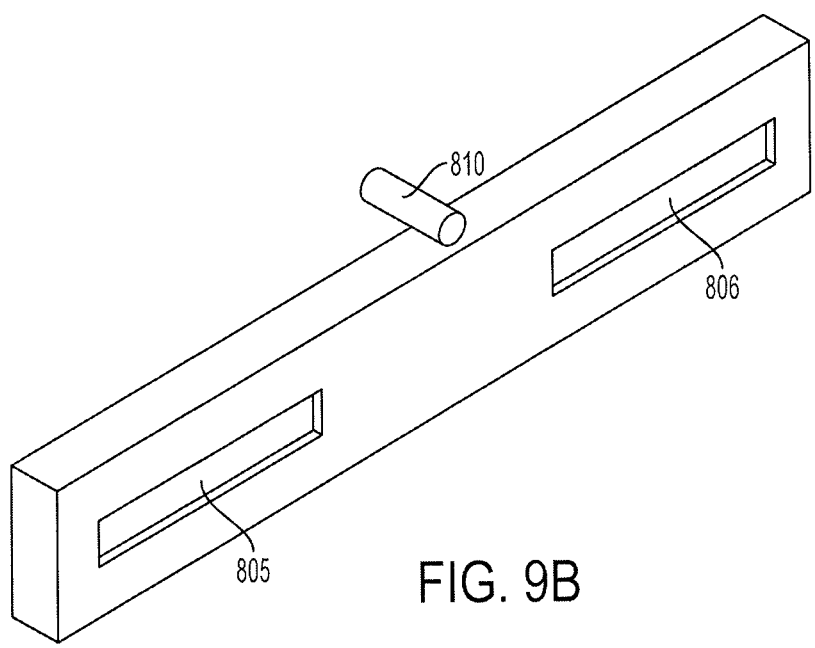

FIGS. 9A and 9B illustrate a schematic representation of another exemplary spectrograph having a side-by-side multiple detector configuration according to various embodiments. The spectrograph of FIGS. 9A and 9B is the same as the spectrograph of FIGS. 8A through 8C with the following differences. Rather than the photodetectors being stacked as in FIG. 8A, photodetectors 805, 806 in FIG. 9A are side-by-side (in this top view). The photodetectors 805, 806 can be sensitive to different wavelength ranges. For example, one of the photodetectors can be sensitive to a wavelength range of about 200-1100 nm, such as a silicon detector, and another of the photodetectors can be sensitive to a wavelength range of about 900-1700 nm, such as an InGaAs detector array or a PbS detector array. Multiple photodetectors can advantageously cover a wide wavelength range without having to change out or reposition the photodetectors, which can be a cost savings. Moreover, the photodetectors can be in close proximity so as to share cooling mechanisms.

FIG. 9B illustrates the aperture 810 and the photodetectors 805, 806 positioned proximate to each other at or about the focal planes of the lens 840. The photodetector 805 can be positioned to measure shorter wavelength ranges. Whereas, the photodetector 806 can be positioned to measure longer wavelength ranges. The position and angular orientation of the mirror 860 can be designed to ensure that light is properly directed at the appropriate angle so as to be measured by the appropriate photodetector. In some embodiments, the mirror 860 can be a flat mirror.

In operation, the spectrograph can perform similar to the spectrographs of FIGS. 1A through 3C and 8A through 8C with the following differences. When the multiple wavelengths 870, 880, 890 of light are transmitted from the lens 840 to the photodetectors 805, 806, the wavelengths can be angled toward the photodetector sensitive to the wavelengths so that that photodetector can measure the wavelengths to generate a light spectrum. The other photodetector can receive substantially little or none of the wavelengths of light.

Various examples of logic described herein can comprise hardware, firmware, or software stored on a computer-readable medium, or combinations thereof. A set of instructions stored on a computer-readable medium that when executed can cause a computing system to perform a method. A computing system programmed to perform particular functions pursuant to instructions from program software can be a special purpose computing system for performing those particular functions. Data that is manipulated by a special purpose computing system while performing those particular functions can at least be saved in electronic buffers of the computing system, physically changing the special purpose computing system from one state to the next with each change to the stored data.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A spectrograph for measuring radiation as a function of wavelength comprising:
    a lens for collecting radiation to be measured;
    at least one detector for generating output signals as a function of position on the at least one detector;
    a first optical assembly for angularly dispersing the collected radiation as a function of wavelength for measurement by the at least one detector;
    a second optical assembly for angularly dispersing the collected radiation as a function of wavelength for measurement by the at least one detector, wherein a spectrum of the dispersed radiation from the second optical assembly reaching the at least one detector is different from a spectrum of the dispersed radiation from the first optical assembly, and wherein each of the first and second optical assemblies include a first transmissive grating and a mirror arranged so that the collected radiation passes through the first grating, is reflected off the mirror and then passes back through the first grating a second time before reaching said detector; and
    a mechanism supporting the first and second optical assemblies and including a movable portion for moving the first and second optical assemblies between first and second positions for selectively aligning the dispersed radiation from one of the first and second optical assemblies with the at least one detector depending upon a desired spectrum to be measured.

2. The spectrograph of claim 1, wherein the first optical assembly comprises:
    a second transmissive grating for further dispersing the dispersed radiation as a function of wavelength, said second grating being positioned between the first grating and the mirror.

3. The spectrograph of claim 1, wherein the mechanism moves at least one of manually or electrically to selectively align the dispersed radiation from one of the first and second optical assemblies with the at least one detector.

4. The spectrograph of claim 1, wherein the at least one detector comprises:
    a first detector; and
    a second detector,
    wherein the first and second detectors are stacked together.

5. The spectrograph of claim 1, wherein the at least one detector comprises:
    a first detector; and
    a second detector,
    wherein the first and second detectors are side by side.

6. A compact spectrograph for measuring radiation as a function of wavelength comprising:
    a housing;
    an aperture for receiving radiation to be measured;
    a lens for collecting and collimating the received radiation;
    at least one detector array for generating output signals as a function of position on the at least one array; and
    a platform supporting first and second sets of optical elements, each set including at least a transmissive grating and a reflecting surface,
    wherein the grating in each set is configured to spectrally disperse the collected radiation as a function of wavelength and the reflecting surface in each set is configured to direct the dispersed radiation back through said grating a second time before reaching the at least one array,
    wherein the first set of optical elements is configured to deliver a spectrum of the dispersed radiation to the at least one array that is different from a spectrum of the dispersed radiation delivered to the at least one array by the second set of optical elements, and
    wherein the platform is movable between first and second positions to selectively align the dispersed radiation from either the first or second set of optical elements with the at least one array.

7. The spectrograph of claim 6, wherein the aperture comprises at least one of a pinhole or a slit.

8. The spectrograph of claim 6, wherein the grating comprises a first grating to spectrally disperse the collected radiation and a second grating to further spectrally disperse the dispersed radiation from the first grating.

9. The spectrograph of claim 6, wherein the grating comprises a holographic element to spectrally disperse the collected radiation.

10. The spectrograph of claim 6, wherein the reflecting surface comprises a mirror.

11. The spectrograph of claim 6, wherein the reflecting surface comprises a substrate having a first surface to direct the dispersed radiation to the at least one array and at least a second surface to reduce stray radiation from the dispersed radiation.

12. The spectrograph of claim 6, wherein the grating in the first set of optical elements is positioned to form a first incidence angle with the collected radiation and has a first pitch so as to disperse the collected radiation, and the grating in the second set of optical elements is positioned to form a second incidence angle with the collected radiation and has a second pitch so as to disperse the collected radiation.

13. The spectrograph of claim 6, wherein the at least one array is configured to measure multiple spectral ranges of radiation of about 530 nm to about 640 nm, about 785 nm to about 1050 nm, about 830 nm to about 1050 nm, or about 1000 nm to about 1700 nm.

14. The spectrograph of claim 6, wherein the at least one detector array comprises:
    a first detector array; and
    a second detector array, wherein the first and second detector arrays are stacked together.

15. The spectrograph of claim 6, wherein the at least one detector array comprises:
   a first detector array; and
   a second detector array,
   wherein the first and second detector arrays are side by side.

16. A spectrograph for measuring radiation as a function of wavelength comprising:
   at least one detector for generating output signals as a function of position on the at least one detector;
   a first optical assembly for angularly dispersing radiation as a function of wavelength for measurement by the at least one detector;
   a second optical assembly for angularly dispersing radiation as a function of wavelength for measurement by the at least one detector,
   wherein the first optical assembly is configured to disperse the radiation within a first spectral range and the second optical assembly is configured to disperse the radiation within a second spectral range and wherein each of the first and second optical assemblies include a first transmissive grating and a mirror arranged so that the collected radiation passes through the first grating, is reflected off the mirror and then passes back through the first grating a second time before reaching said detector; and
   a mechanism for moving the first and second optical assemblies between first and second positions so as to select the dispersed radiation from either the first or second optical assembly for measurement by the at least one detector.

17. The spectrograph of claim 16, wherein the at least one detector comprises:
   a first detector for generating output signals of measurement of the dispersed radiation within the first spectral range; and
   a second detector for generating output signals of measurement of the dispersed radiation within the second spectral range,
   wherein the first and second detectors are stacked together.

18. The spectrograph of claim 16, wherein the at least one detector comprises:
   a first detector for generating output signals of measurement of the dispersed radiation within the first spectral range; and
   a second detector for generating output signals of measurement of the dispersed radiation within the second spectral range,
   wherein the first and second detectors are side by side.

* * * * *